UNITED STATES PATENT OFFICE.

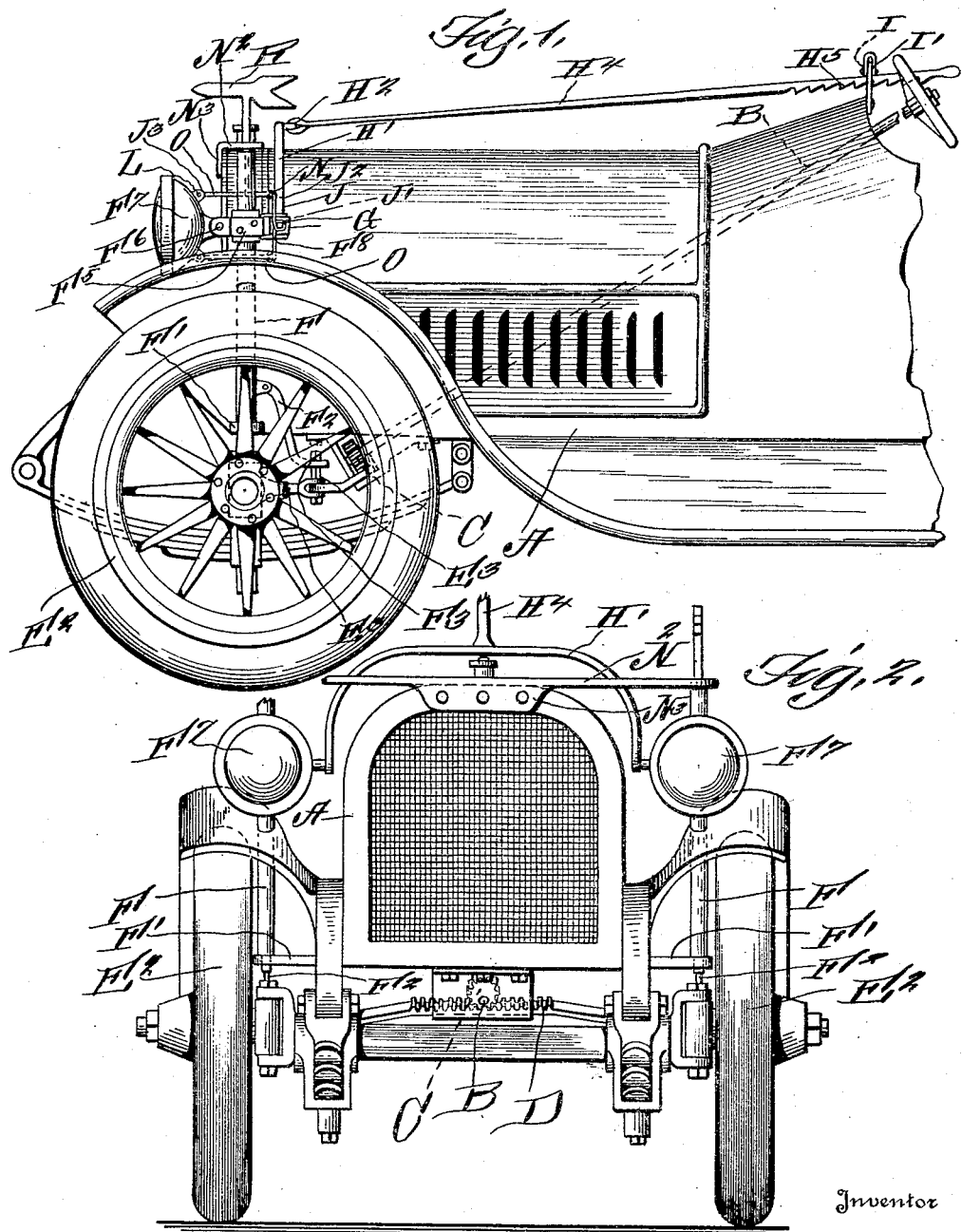

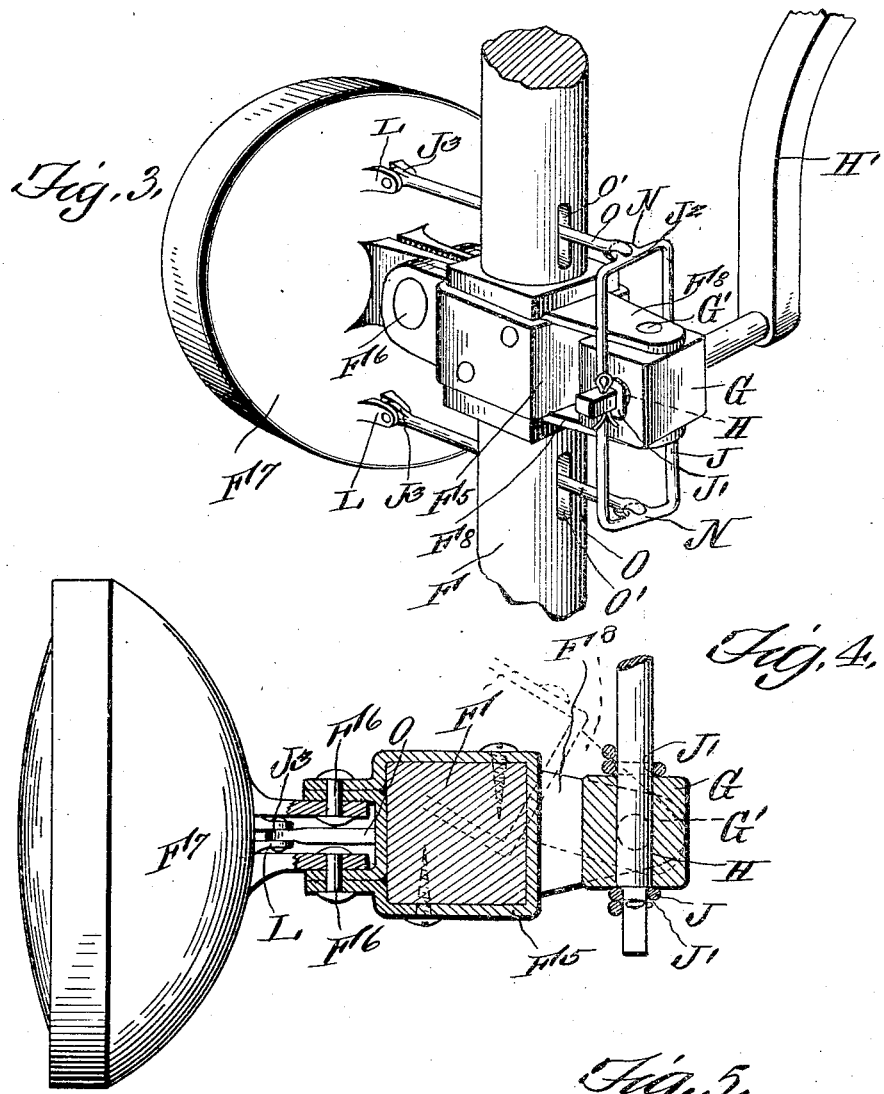

ENOCH M. CRUMPTON, OF BRYSON, TEXAS, ASSIGNOR OF ONE-HALF TO W. C. McCLOUD, OF BRYSON, TEXAS.

DIRIGIBLE HEADLIGHT.

1,290,918.        Specification of Letters Patent.       Patented Jan. 14, 1919.

Application filed November 21, 1917. Serial No. 203,163.

*To all whom it may concern:*

Be it known that I, ENOCH M. CRUMPTON, a citizen of the United States, residing at Bryson, in the county of Jack and State of Texas, have invented certain new and useful Improvements in Dirigible Headlights, and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dirigible light apparatus and indicating means, designating the direction in which the vehicle is steered.

The invention consists of a simple and efficient light dirigible means adapted to be attached to various makes of automobiles having stub axles actuated by various forms of steering mechanisms.

My invention is illustrated in the accompanying drawings, which with the letters of reference marked thereon, form a part of this specification and in which:

Figure 1 is a side elevation of an automobile showing the application of my invention.

Fig. 2 is a front elevation, Fig. 3 is a detailed perspective view, Fig. 4 is a cross sectional view, and Fig. 5 is a detailed perspective of a part of the device.

Reference now being had to the details of the drawings by letter:

A designates the body of an automobile, and B the steering shaft, having a gear wheel C fixed at its lower end and which is in mesh with the teeth of a rack bar D, the ends of which are pivotally connected to pins $E^3$, which in turn are connected to the stub shafts E', on which the wheels $E^2$ are journaled. Axially movable lamp posts, designated by letter F are mounted in the laterally extending bracket arms F' upon the chassis of the car over the forward axle. An arm, designated by letter $F^2$, is fastened to each lamp shaft and has a laterally extending portion $F^3$, with an elongated slot $F^4$ therein for the reception of said pin, there being one of said arms upon each lamp shaft on either side of the automobile.

Each lamp post has a bracket member $F^5$ fastened to squared portions thereof and between the forwardly extending portions of the bracket members pins $F^6$ are mounted and upon which the lamps $F^7$ are pivoted, in such manner as to permit the lamp to be tilted up and down, but not sidewise, independent of the axial movement of the lamp post. Said bracket member $F^5$ has arms $F^8$ projecting parallel from each other rearwardly from the post, and G designates a non-oscillating block, which has lugs G' projecting from the top and bottom thereof and adapted to have bearings in the bracket arms $F^8$. Said block G, there being one upon each post of similar construction, is provided with a transverse aperture H, to receive the crank end of the bail-shaped member H', and which has pivotal connection through the union $H^2$ with an operating rod $H^4$, notched as at $H^5$ and passing through an aperture I in the plate I', which latter is fastened to the bulk-head of the automobile.

Said plate I' has an adjustable top $I^2$, pivoted at $I^3$ and its free swinging end is fastened, as at $I^5$, said top being adapted to swing upon its pivot, when it is desired to remove the operating rod. A bracket shaped member, designated by letter J, has eyes J' adapted to receive the crank upon either side of the block, said eyes being fastened to the crank and adapted to swing with the same, as the bail-shaped member is rocked. Said bracket-shaped member has projections $J^2$ in alinement with each other, one above and one below the block to which the eyes N upon the links O are pivotally connected. Said links have longitudinal movements through slots O', formed in the lamp posts, one above and one below the bracket member which is secured to the latter, the forward ends of said links being provided with eyes $J^3$, which are pivotally connected to the lugs L upon the lamp posts, one above and one below the pivotal connection of the latter with the bracket arms upon the posts.

By this mechanism, actuated by the operating rod, it will be noted that the lamp may be given an up and down tilting movement, independent of the steering mechanism of the automobile and through the medium of the connections of the rack bar geared to the steering bar, the two lamp posts may be moved in unison with the two front wheels of the automobile.

A plate N² has a laterally extending portion N³, which is fastened to the hood of the automobile, and its ends are apertured to receive the upper contracted portions of the lamp posts above the lamps, forming suitable bearings therefor. At the extreme upper ends of the contracted portions of the lamp posts are mounted the indicating means R, which in the present instance are in the form of arrows, although other forms of indicating means may be mounted upon the posts, if desired.

It will be noted that by the construction shown, means is provided whereby a mechanical attachment is afforded for attaching dirigible lights to any make of automobile having stub axles operated by various forms of steering mechanism. While I have shown a particular form of apparatus embodying the principle of my invention, it will be understood that the detailed construction of the apparatus may be varied in different ways without in any way departing from the spirit of the invention.

By the provision of the device embodying the features of my invention, it will be noted that the lamps may be tilted to the right or left of the automobile through the medium of the steering gear to throw the rays of light upon the paths to be traversed by the automobile, and in the oscillatory movement without interference with the mechanism which is utilized to tilt the lamps up and down. When it is desired to throw the rays of light up and down it may be done independent of the steering mechanism through the connecting rod which is connected to the tilting bail-shaped member, as will be readily understood. As the lamps turn to the right or left, the arrows will turn accordingly, thus giving visible signal to denote the direction in which the automobile is to travel.

What I claim to be new is:—

1. A dirigible light for automobiles comprising an axially movable lamp post and mounting therefor, bracket member secured to the post, and a lamp pivotally mounted upon the bracket member, arms projecting from said member, a block mounted between said arms, a rock shaft journaled in said block, bail-shaped members fastened to said rock shaft, and pivotal link connections between said bail-shaped members and the lamp, and a manually-operated attachment secured to said rock shaft.

2. A dirigible light for automobiles comprising an axially movable lamp post having slots therein and suitable mountings for said post, a bracket member fastened to said post and a lamp pivotally connected to the ends of said member, arms projecting from the bracket member opposite the lamp, a block mounted between said arms, a rock shaft journaled in said block, bail-shaped members secured to the rock shaft, links pivotally connecting the adjacent ends of said bail-shaped members passing through said slots in the post and pivotally connected to the lamp, and a manually-operated lever connected to said rock shaft.

In testimony whereof I hereunto affix my signature in presence of two witnesses.

ENOCH M. CRUMPTON.

Witnesses:
 B. C. McCLOUD,
 MINNIE LIPSCOMB.

Copies of this patent may be obtained for five cents each, by addressing the "Commissioner of Patents, Washington, D. C."